Feb. 1, 1949.                  C. E. O. LARKIN                  2,460,461
                    SPRING ACTUATED TELESCOPING PERISCOPE
Filed Jan. 15, 1946                                     2 Sheets-Sheet 1
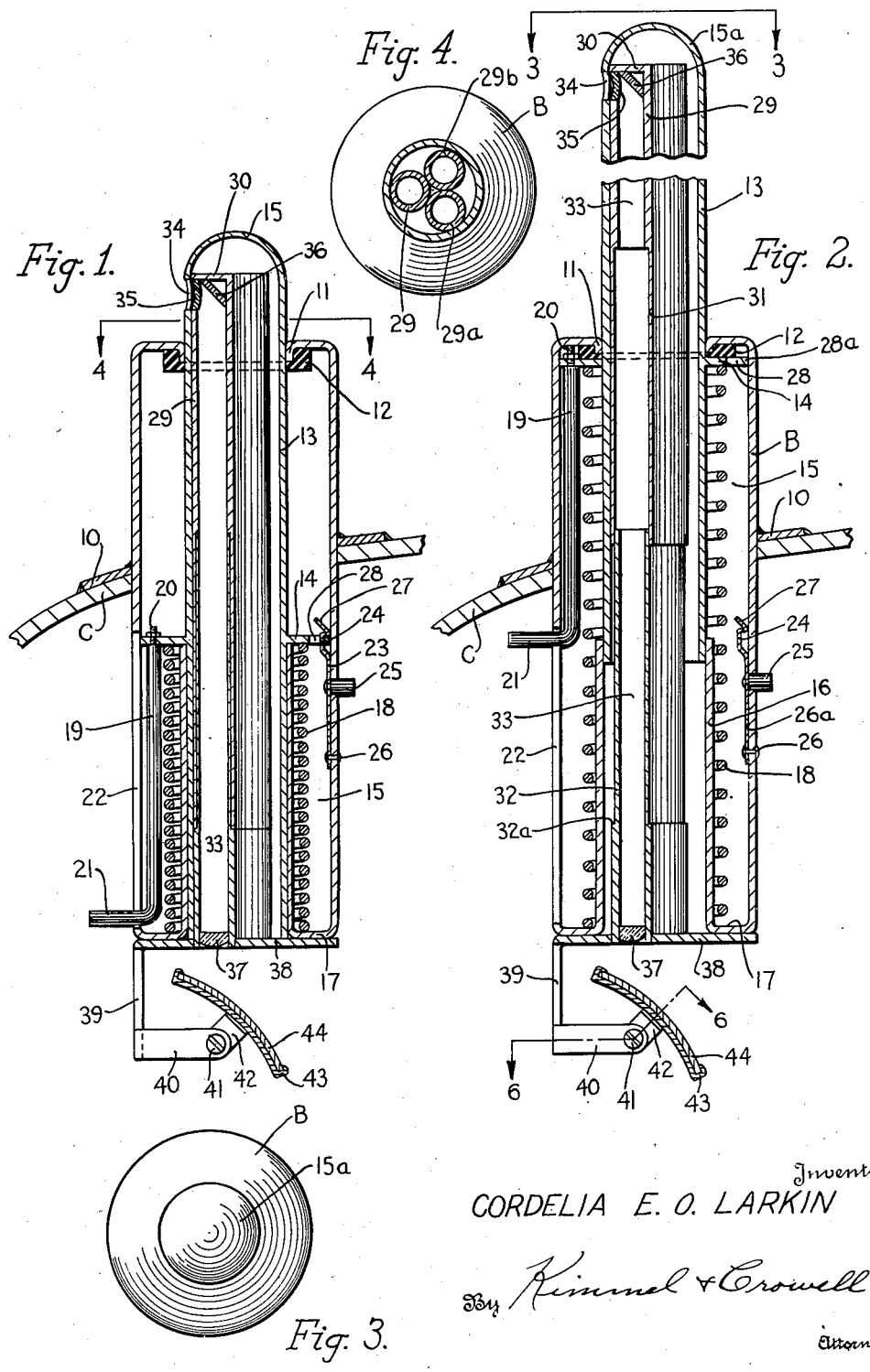
Inventor
CORDELIA E. O. LARKIN
By Kimmel & Crowell
Attorneys Feb. 1, 1949.   C. E. O. LARKIN   2,460,461
SPRING ACTUATED TELESCOPING PERISCOPE
Filed Jan. 15, 1946
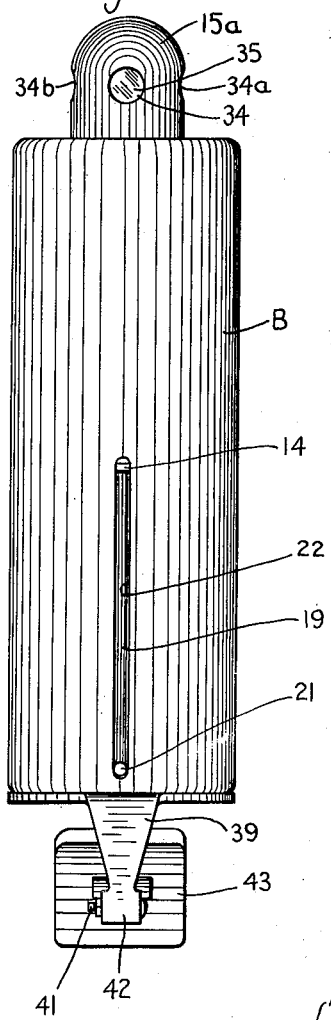
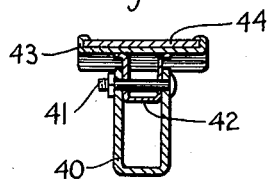
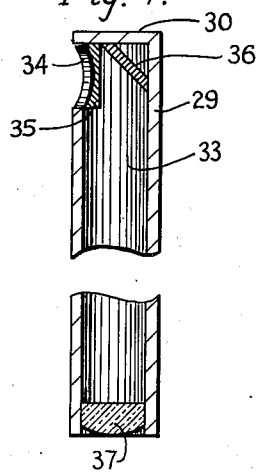
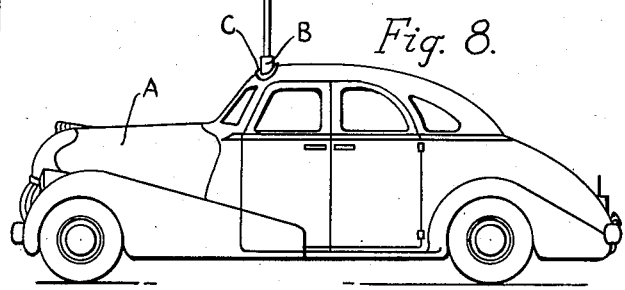
Inventor
CORDELIA E. O. LARKIN Patented Feb. 1, 1949

2,460,461

UNITED STATES PATENT OFFICE 2,460,461

SPRING ACTUATED TELESCOPING PERISCOPE

Cordelia E. O. Larkin, St. Petersburg, Fla.

Application January 15, 1946, Serial No. 641,211

3 Claims. (Cl. 88—72)

This invention relates to improvements in vehicles such as self-propelled vehicles and the like and more particularly to an apparatus for giving the vehicle operator knowledge of road and other conditions not only lying above the level of the car ahead but to either side thereof, under circumstances where ocular vision, unaided, would fail to observe the same.

One of the objects of the present invention is to provide a simple, efficient and inexpensive device of this character attached as a permanent fixture to an automobile in such a manner that the operator, from inside of the car can obtain the location, range and characteristics of objects from various angles with respect to the car, not directly observable directly in front of him, and whereby he can observe objects from either of opposing sides of the car at the same time, or observe road conditions hidden directly from sight which periscopic vision can readily reveal to him from his seated position.

A further object of the present invention is to provide a periscope apparatus upon the roof of the vehicle which has one part projecting down into the car for registering by reflection upon an adjustable mirror within focus of the periscope apparatus, such periscopic views being arranged to be focused by such apparatus from varying angles of the vehicle.

Another object of the present invention is to provide means, in a device of the character described, for enabling the driver inside of an automobile or like vehicle, to effect adjustment of the sights of the periscope or periscopes for securing better and sharper definition of the images reflected by them upon the mirror directly in proximity to his eyes inside of the vehicle. In carrying out this function it is proposed to arrange manually controlled means adjacent to the operator's seat within his ready reach for actuating the adjusted movements of any or all of the periscopes.

With the above and other objects in view my invention consists in the combination, arrangement and details of construction arranged in the drawings and specifications, and then more particularly pointed out in the appended claims.

In the drawing, wherein similar reference characters designate similar parts throughout the respective views, Figure 1 is a vertical sectional elevation of my invention, Figure 2 is a view similar to Figure 1 but showing certain parts in a qualified position, Figure 3 is a top plan view of a telescopic member to be described, Figure 4 is a view similar to Figure 3 except that parts are shown in section to reveal plural periscope tubes.

Figure 5 is an elevation of my invention.

Figure 6 is a vertical sectional elevation of a lens mounting,

Figure 7 is a fragmental sectional elevation of one of the periscopes, and

Figure 8 is a side view of an automobile showing my invention operatively applied thereto.

In the drawings, which are merely illustrative of my invention I disclose a vehicle, preferably an automobile A upon the roof C of which is arranged my device broadly designated B. My invention consists of a tubular casing B secured between its ends by means of a mounting 10 directly to the automobile roof C in any effective manner, in such a way that part of casing B extends downwardly into the interior of the vehicle and another part projects above the roof of the vehicle as shown in Figure 8. The casing B is formed at its upper end with a closed end which is depressed concentrically into the interior 15 of the casing to provide a reduced throat 11 therein. Telescopically arranged concentrically in said casing is a ferrule or tubular member 13 closed at its upper end and having midway of its length a flange 14 which, piston-like works up and down in the casing B. The lower end of this ferrule is received slidably and snugly in a fixed tube 32, also disposed concentrically of and in the lower end of the casing, which tube has a stop shoulder 32a formed exteriorly thereof. There is a preferably rubber buffer gasket 12 operatively located so as to embrace the reduced throat 11 of the casing which has a pliable part extending below the throat for undergoing compression by means of the flange 14 of the ferrule 13 when the coiled spring 18 in the casing holds this flange and the ferrule itself in upwardly extended position as illustrated in Figure 2. This spring 18 rests upon the bottom of the casing in an annular chamber around ferrule 13 as at 17, and at its upper end it holds the flange 14 non-compressibly against the buffer washer 12.

Concentrically arranged inside of the extensible ferrule 13 are a plurality, preferably three tubes 29, 29a and 29b respectively nested in close proximity to one another as disclosed in Figure 4. As each tube is of similar construction and bearing, I shall describe the mounting and attributes of but one of them. These tubes have a telescopic slidable mounting, each on a separate lower fixed tube 32 secured upon the bottom of the casing, which fixed tube is formed exteriorly thereof with a stop shoulder 32a. The interior passageway in each tube is designated 33. Each tube 29, 29a and 29b opens out of the bottom 38 of the casing where a lens is fitted so as to close same, as at 37.

An arm 39 depends directly from the bottom of casing B into the interior of the vehicle at an observation point therein easily accessible to the car driver, which arm carries a preferably horizontally extending saddle member 40 in which is pivotally mounted a U-shaped swivel member 42 to which a convex mirror holder 43 is operatively attached between its ends, in which is fitted a convex mirror 44, and a pivot pin 41 passes through the U-shaped member 42 into the saddle member 40 and serves as a means of pivotably adjusting this mirror 44 at any desired angle effective to focus to the best advantage images to be reflected by periscopes located at the upper end of the mentioned tubes 29, 29a and 29b.

The upper ends of the tubes are closed, and formed in a plane with the upper ends thereof are ports in which concavo-convex lens 35 are fitted operatively, which lens are directly in back of ports 34, formed upon the upper end of the ferrule 13. Directly in back of the lens 35, in each tube 29, 29a and 29b is an inclined mirror inclining downwardly from engagement with the upper back end of the lens, and rearwardly of these lenses, so as to engage and bear against the diametrically opposite point of the tube from where the lens 35 is located. It will be seen that these parts in conjunction with the ports 34 (one for each separate tube) form periscopes which are in vertical alignment with the bottom lenses 37 respectively, the passageway 33 inside of which tube affords an unobstructed sight from lens 37 to lens 35 by way of mirror 36. It will also be seen that lenses 37 are directly within focal range of the convex mirror 44 arranged there below.

As a means of adjusting the vertical distance of the ferrule and contained tubes from top of the car A, I provide a downwardly extending rod 19 in the casing B, whose upper threaded end 20 is screwed home into flange 14 of the ferrule 13 and whose lower end is formed with a right angular handle portion 21 which projects through an elongated slot 22 formed upon the casing B, which handle 21 is within easy reach and grasp on the part of the operator of the car.

As a means of latching the ferrule and contained tubes in adjusted vertical position I provide the flange 14 of the ferrule preferably with a slot 28 at one end; I also provide a flat spring finger 26a, secured at its lower end as at 26 to casing 13, said finger is formed short of its outer end with a latching offset 24 and with a terminal inclined lip 27 in advance of this offset, while a push button 25 is secured at its inner end to this finger 26a between its ends, which is slidably mounted upon casing 13 so as to project outside thereof for operational purposes.

In operation the parts will function as follows: It will be observed from Figure 1 that the handle 21 is located at the lower end of casing 13, in that part thereof that extends into the interior of the car A, in close proximity with respect to the adjustable mirror 44, so that both are within convenient reach of the operator seated. With the parts in position as shown in Figure 1, the periscopes are disposed in their lowermost positions with respect to the roof of the car. It is obvious that objects in the roadway in all sides of the car, and objects at a sharp distance and angle to line of vision of the operator ordinarily but within the range of the focal power of the periscopes will be reflected through ports 34, lenses 35 and mirrors 36, by way of sight passages 33 of the tubes, through the lenses 37 directly upon adjustable mirror 44, so images of same may be observed by the operator. If he desires to obtain a sharper definition of these objects he can adjust the height of the periscopes accordingly; this is done by taking hold of the handle 21 and operating a push button 25. Thus in Figure 1 the flange 14 of ferrule 13 has been lowered as far as it will go downwardly, this flange having compressed the coiled spring 18. Slot 28 of this flange has an inclined or wedge shaped edge 28a (Figure 2) which rides over the inclined lip 27 of spring finger 26a when coming in contact with same, thereby allowing this lip to snap through slot 28 and overlie the flange 14 when in downmost position, Figure 1, to effectively latch the ferrule in lowered position, and to hold it in such position against accidental displacement. This latching of the flange is accomplished automatically during the descent of the ferrule to its uppermost position automatically simply by pushing button 25 inwardly of the casing, to thereby allow the lip 27 of spring finger 26a to come opposite the slot 28 in flange 14 of ferrule 13, at which time the flange passes the lip, since the latter no longer holds onto any part of the flange. The spring 18 then will relax, causing the ferrule flange to be projected upwardly as far as it will go upwardly, so that flange 14 engages the buffer rubber gasket 12 and is cushioned in shock by it against the impact made by the spring 18. As the ferrule thus moves upwardly it will be seen that the handle 21 for the ferrule also moves upwardly in elongated shot 22 of the casing. When the operator desires to lower the ferrule and contained tubes, and to cause the periscopes also to be lowered, he takes hold of the handle 21 when it is in elevated position illustrated in Figure 2, and pulls the same down with sufficient pressure to draw the ferrule 13 down along with it, as the flange again compresses spring 18, and the flange 14 will soon be automatically latched by spring finger 26a in a manner already described.

By adjusting the angle of inclination of the mirror 44 the operator can focus the images reflected through the tubes 29, 29a and 29b to better advantage. Objects at some distance from the car, and at high elevations call for properly adjusting the ferrule 13 in casing B. From Figure 5 it will be clearly observed that the three lenses in the three tubes are trained in such a way upon objects to be reflected upon mirror 44 that two of them are arranged at diametrically opposite points of the adjustable ferrule and another disposed at right angles with respect to the last two. The apparatus makes a convenient attachment to automobiles and renders progress of the vehicle upon the roadway less dangerous due to placing within focus of the eyes of the operator of the car everything he should see that influences careful driving.

I do not intend to limit myself to the exact details of construction herein disclosed but intend to cover all variations falling within the purview of the appended claims.

What I claim is:

1. A periscope for mounting on a vehicle comprising an elongated tubular casing, an inner end wall fixed to said casing, a tubular guide fixed to said wall and disposed concentrically within said casing, a tubular slide engaging said guide and projecting at one end from said casing, an annular flange fixed to said tubular slide within said casing, a spring in said casing between said inner end wall and said flange constantly urging said tubular slide to extended position, spring-pressed latch means engaging in said flange for locking said tubular slide in retracted position, an angled mirror in the upper portion of said tubular slide, a lens at the inner portion of said casing, and a second angled mirror carried by the inner end of said casing for reflecting the object viewed through said lens and said first mirror.

2. A periscope for mounting on a vehicle comprising an elongated tubular casing, an inner end wall fixed to said casing, a tubular guide fixed to said wall and disposed concentrically within said casing, a tubular slide engaging said guide and projecting at one end from said casing, an annular flange fixed to said tubular slide within said casing, a spring in said casing between said inner end wall and said flange constantly urging said tubular slide to extended position, spring-pressed latch means fixed on said casing and engaging through said flange for locking said tubular slide in retracted position, an angled mirror in the upper portion of said tubular slide, a lens at the inner portion of said casing, a second angled mirror carried by the inner end of said casing for reflecting the object viewed through said lens and said first mirror, and means fixed relative to said tubular slide and projecting from said casing for retracting said tubular slide.

3. A periscope for mounting on a vehicle comprising an elongated tubular casing, an inner end wall fixed to said casing, a tubular guide fixed to said wall and disposed concentrically within said casing, a tubular slide engaging said guide and projecting at one end from said casing, an annular flange fixed to said tubular slide within said casing, a spring in said casing between said inner end wall and said flange constantly urging said tubular slide to extended position, spring-pressed latch means engaging through a correlated opening in said flange for locking said tubular slide in retracted position, an angled mirror in the upper portion of said tubular slide, a lens at the inner portion of said casing, a second angled mirror carried by the inner end of said casing for reflecting the object viewed through said lens and said first mirror, said casing having an elongated slot therein, and a retracting member fixed to said flange and extending outwardly through said slot.

CORDELIA E. O. LARKIN.

REFERENCES CITED

The following references are of record in the file of this patent:

UNITED STATES PATENTS

| Number | Name | Date |
|---|---|---|
| 1,175,609 | Cottrell | Mar. 14, 1916 |
| 1,313,534 | Hoffman | Aug. 19, 1919 |
| 1,466,567 | Smith | Aug. 28, 1923 |
| 1,486,231 | Cox | Mar. 11, 1924 |
| 1,635,011 | Sadler | July 5, 1927 |
| 1,644,902 | Voigt | Oct. 11, 1927 |
| 1,900,930 | Hauser | Mar. 14, 1933 |
| 2,398,354 | Brinkley | Apr. 16, 1946 |

FOREIGN PATENTS

| Number | Country | Date |
|---|---|---|
| 398,622 | France | Mar. 29, 1909 |
| 230,064 | Germany | Jan. 13, 1911 |
| 299,859 | Italy | Aug. 19, 1932 |